April 1, 1952 N. SWERDLOW ET AL 2,591,386
INSULATED SECTIONALIZED BUS DUCT SYSTEM
Original Filed Aug. 31, 1948
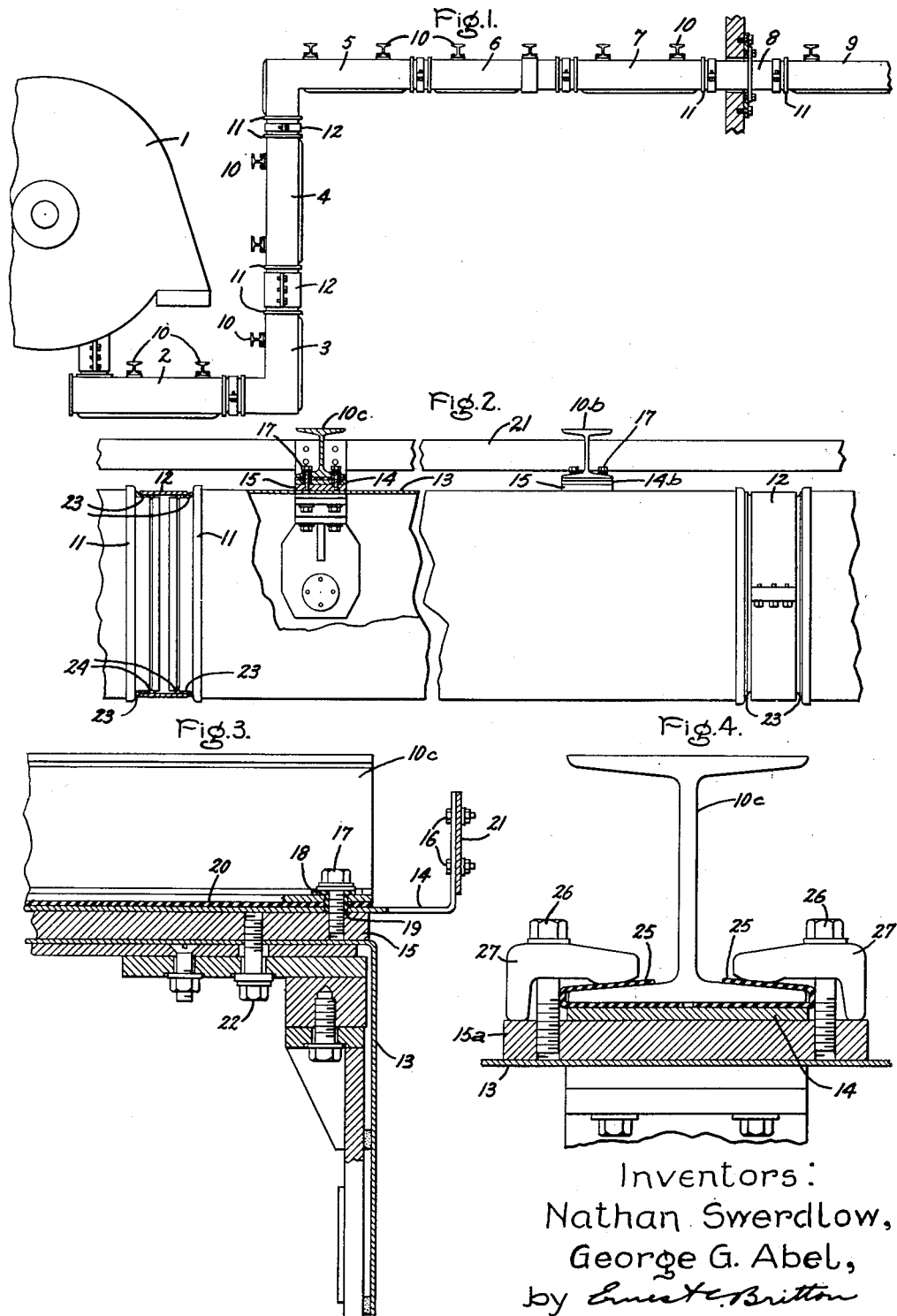
Inventors:
Nathan Swerdlow,
George G. Abel,
by Ernest C. Britton
Their Attorney.

Patented Apr. 1, 1952

2,591,386

UNITED STATES PATENT OFFICE 2,591,386

INSULATED SECTIONALIZED BUS DUCT SYSTEM

Nathan Swerdlow, Philadelphia, and George G. Abel, Media, Pa., assignors to General Electric Company, a corporation of New York Original application August 31, 1948, Serial No. 47,128. Divided and this application November 1, 1949, Serial No. 124,925

5 Claims. (Cl. 174—70)

This invention relates to enclosed electric bus installations and more particularly to an insulating mounting arrangement for electric bus systems of the isolated phase type. This application is a divisional application of pending application Serial No. 47,128, filed August 31, 1948.

In bus installations such, for example, as are used in high capacity electric power generating stations, it is vital that a high degree of reliability be achieved in order that outage time may be minimized and, furthermore, it is desirable that all the parts of the bus system be arranged so as to be readily accessible for testing, inspection, and repair, if necessary, so as further to minimize undesirable outage time.

One object of our invention is the provision of supporting structure for a bus run of the isolated phase type which is capable of minimizing circulating currents induced in the sheath due to the flow of current through the bus and which structure lends itself to simple yet reliable testing procedures.

Further objects and advantages of our invention will become apparent as the following description proceeds and the features of novelty which characterize our invention will be pointed out with particularity in the claims annexed to and forming a part of this specification.

For a better understanding of our invention, reference may be had to the accompanying drawings in which Fig. 1 is a side view of a portion of a generating station showing the generator and a sectionalized bus run comprising the representative units designated by the numerals 2 through 9; Figs. 2 and 3 represent a particular construction whereby the various units, such as 2 through 9 of Fig. 1, may be insulated one from the other and also from ground except at a particular point of connection to a ground bus; and Fig. 4 represents a modification of the construction shown in Figs. 2 and 3.

With reference to Fig. 1 the numeral 1 designates a station power generator which is connected to a sectionalized bus run only one phase of which, for convenience, is shown. The units 2 through 9, comprising the single phase bus run, are supported by means of suitable I-beams 10 which in turn are secured to the station ceiling, walls, or other suitable supporting structure in any convenient manner, which is not shown. The sections or units 2 through 9 are factory assembled and all are alike in that they terminate at their respective ends in a projecting cylindrical flange 11. When the various units 2 through 9 have been mounted in their predetermined positions in the station, they may then be connected together at each junction by a clamping band 12 which embraces the separated flanges 11. It will be understood that various combinations of the units 2 through 9 collectively constitute a conducting bus disposed axially within a square-sectioned box-like metallic sheath and that the conducting members therein are supported on insulators within the sheath. For a bus of high current carrying capacity, the sheath preferably is constructed of suitable non-magnetic material, such as aluminum.

It will be further understood that in such a station bus arrangement, longer bus runs than that depicted for illustration in Fig. 1 would usually be involved; accordingly, the major portion of the total length of the bus would be constituted by a number of "standard" units of some predetermined convenient short length of several feet. The numerals 4, 7, and 9 indicate typical identical units, and it will be observed that such standard straight units may be mounted vertically, horizontally or in any position for which suitable mounting structure has been provided.

The component parts of the standard units are such that they are readily adaptable for use with units possessing forms different from the straight type, such as, for example, the angle units indicated by the numerals 2, 3 and 5. Also, the rectangular box-like bus sheath with its short cylindrical end flanges lends itself readily to special purpose adaptations thereof such as will hereinafter be described.

The structure thus far described comprises a continuous single-phase bus run made up of segmental portions or units. The various adjoining units might be insulated from each other longitudinally of the bus by means such as sealing rings interposed between the clamping bands 12 and the flanges 11, which rings are effective for limiting the flow of undesirable induced longitudinal circulating currents as is well known in the art. If the sheath of each unit of the bus is grounded by virtue of a bolted connection to the I-beams 10 which ordinarily are connected to ground, circulating currents might not flow through the junction between adjoining units, but by virtue of the ground connection made at two points on each unit, the ability of induced currents to circulate through each sheath via the two grounded points will produce objectionable heating. This circulation may be prevented by insulating the sheath at one of its two points of support by any well known manner. With such an obvious arrangement, however, it would be impossible to determine as by a bell set whether the insulating seal ring between two adjoining units was effective as an insulating means or not because, if a test connection were made to one unit's sheath through a battery and a bell to the sheath of an adjoining or any other unit, the bell would ring in any event because of the parallel circuit afforded by the grounded structure via the mounting of the uninsulated I-beam of each bus unit.

If, however, each bus unit were entirely insulated from the grounded supporting structure, so that grounding were possible only through an isolated ground or test bar connected to each unit, the above-mentioned bell test could be applied effectively, providing the ground bar of one of the units involved were disconnected (or not yet connected) to the common ground bus associated therewith. Figs. 2 and 3 illustrate a practical application of this concept wherein the sheath 13 of each unit is entirely insulated from the I-beams 10b and 10c, and, because the ground bar 14 is also insulated from the I-beams, the only possible electrical path from the sheath to the common ground bus 21 which parallels the run is that via the bar 14. In a preferred construction, the I-beam 10c has permanently mounted thereto, but insulated therefrom, a mounting bar 15 in addition to a ground bar 14. A projecting, upturned end of the ground bar 14 is detachably secured to the ground bus 21 by the bolts 16. The bolts 17 secure the mounting bar 15 and ground bar 14 to the I-beam 10c without forming an electrical path therebetween because of the provision of insulating washer 18 and insulating sleeve 19. Insulating strip 20, clamped between the I-beam 10c and the ground bar 14, prevents any current flow from the sheath 13 to the beam 10c; and the mounting bar 15 can be regarded as a permanent fixture to the I-beam 10c but insulated therefrom. Thus, from Fig. 3 particularly, it will be seen that the sheath 13 and parts connected therewith can be grounded only through the mounting bar 15, the ground bar 14, and the ground bus 21. It will further be understood that an insulated structure similar to that shown in Fig. 3 would be used in connection with the other I-beam 10b of the unit of Fig. 2, except that instead of the ground bar 14 which connects to the bus 21, a metallic spacer bar 14b of the same thickness as the ground bar would be used. This bar 14b does not extend beyond the ends of the I-beam for its sole function is that of a spacer of equivalent thickness to the ground bar. An insulated bus unit as described above would be secured to the beam structure by main mounting bolts 22. For preventing inadvertent electrical contact between the edges of the jointing straps 12 with either of its associated units, thin auxiliary insulation strips 23, which may be cemented to the end members 11, preferably are employed, and sealing rings 24 render the enclosure dust tight.

From the above description, it will be clear that the only electrical path possible from the sheathed structure of a unit is via its ground bar 14 so that, if a bell set were connected to the sheath 13 of Fig. 2 and to a similarly constructed adjoining sheath section, it would test the insulation comprising the rings 24 and the strips 23 provided that the ground bar 14 of one of the units were disconnected from the ground bus 21 by unbolting the bolts 16 and by separating the ground bar 14 from the ground bus 21. In such a test, the bell would not ring if the insulation were sound.

Fig. 4 shows an alternative arrangement for securing a mounting bar 15a insulatingly to an I-beam such as 10c. In this construction, an insulating strip or strips 25 are disposed around the lower flange of the I-beam thereby isolating it electrically from the mounting and ground bars. The mounting bar 15a which is appropriately wider than the bar 15 is secured to the I-beam by means of bolts 26 and clamps 27 and, as will be seen from Fig. 4, the insulating strip 25 extends around the edges of the I-beam in such a way as to insulate the clamps 27 and bolts 26 therefrom. The arrangement of Fig. 4 makes it unnecessary to drill holes through the I-beam and, furthermore, dispenses with the insulating sleeves 19 of Fig. 3 and the insulating washers 18, best shown in that figure.

Although the foregoing detailed description has dealt with a single-phase bus run for simplicity, it will be understood that three-phase bus is more commonly employed in practice. In such cases, it will be readily appreciated that three identical single-phase bus units would be disposed in close side-by-side relationship which would depend from a pair of common I-beams 10 extending across the collective breadth of the three units.

While we have shown and described particular aspects of our invention, it will be obvious to those skilled in the art that various changes and modifications may be made without departing from our invention and we, therefore, intend in the appended claims to cover all such changes and modifications as fall within the true spirit and scope of our invention.

What we claim as new and desire to secure by Letters Patent of the United States is:

1. In an isolated phase bus run having an enclosing sheath for each phase conductor and constructed of a plurality of unitary structures each including an enclosing sheath, a first supporting means mounted exteriorly of and adjacent to each of said structures, a ground bar and a first mounting bar secured to said first supporting means and insulated therefrom, means for securing each of said structures to the adjacent first mounting bar, means for removably connecting said ground bar to a grounded ground bus, a second supporting means mounted exteriorly of and adjacent to each of said structures, a second mounting bar and a spacer member secured to said supporting means and insulated therefrom, means for securing each of said structures to the adjacent second mounting bar, and means for forming an insulating junction between the sheaths of adjacent unitary structures for minimizing the flow of circulating currents in said sheaths.

2. In an isolated phase bus run having an enclosing sheath for each phase conductor and constructed of a plurality of unitary structures each including an enclosing sheath, a first supporting means mounted exteriorly of each of said structures, a ground bar and a first mounting bar secured to said first supporting means and insulated therefrom, means for removably connecting said ground bar to a grounded ground bus, a second supporting means mounted exteriorly of each of said structures, a second mounting bar and a spacer member secured to said supporting means and insulated therefrom, bolting means disposed within openings in each of said structures which are of substantially greater diameter than the diameter of said bolting means for securing said structures to each of said mounting bars, so that said structures may be assembled without the necessity of precisely positioning said first and second supporting means, and sealing means of insulating material for forming a weather-tight junction between the sheaths of adjacent unitary structures and for preventing the flow of circulating currents between such junctions.

3. In an isolated phase bus run having an enclosing sheath for each phase conductor generally comprising a plurality of unitary structures each including an enclosing sheath member, a first supporting means mounted exteriorly of each of said structures, a ground bar and a first mounting bar disposed between each of said structures and each of said first supporting means, a first layer of insulating material disposed between each of said first supporting means and said ground bar and having a portion thereof extending around another surface of each of said first supporting means, means for removably connecting said ground bar to a grounded ground bus, a second supporting means mounted exteriorly of each of said structures, a second mounting bar and a spacer member disposed between each of said structures and said second supporting means, a second layer of insulating material disposed between each of said second supporting means and said spacer member and having a portion thereof extending around another surface of each of said second supporting means, means cooperating with each of said mounting bars and each of said supporting means and engaging said portion of each of said insulating layers for removably securing said first and second mounting bars to said first and second supporting means, means for removably securing each of said structures to said first and second mounting bars, and sealing means of insulating material for forming a weather-tight junction between the sheaths of adjacent unitary structures and for preventing the flow of circulating currents between such junctions.

4. In a sectionalized isolated phase bus run comprising a plurality of similar sheathed units, plural mounting means for rigidly connecting each said similar unit to a supporting structure, insulating means interposed at each said mounting means for precluding current flow therethrough from said unit to the supporting structure, a joint between each said unit for rendering the sheathing about said bus substantially continuous, insulating means at each said joint for precluding current flow between the sheaths of the conjoined units, a ground bar electrically connected to the sheath of each said unit, said ground bars being disconnectably attached to a common ground bus, whereby circulating currents in the bus sheath are minimized and the testing of the insulated joints of said units is facilitated by disconnecting said ground bars.

5. In a sectionalized isolated phase bus run comprising a plurality of similar sheathed units, means for mounting each said unit to a foundation structure and for conjoining it to an associated unit at its either end, means for electrically insulating each said unit from the said foundation structure and from its conjoined units, a ground bus, and a disconnectable ground connection conductively arranged between certain of said units and said ground bus whereby upon disconnection thereof said certain unit sheaths are rendered electrically isolated.

NATHAN SWERDLOW.
GEORGE G. ABEL.

REFERENCES CITED

The following references are of record in the file of this patent:

UNITED STATES PATENTS

| Number | Name | Date |
|---|---|---|
| 960,066 | Bluhm | May 31, 1910 |
| 2,275,203 | Rudd | Mar. 3, 1942 |
| 2,313,972 | Rugg et al. | Mar. 16, 1943 |